United States Patent [19]
Kobus et al.
[11] 3,770,899
[45] Nov. 6, 1973

[54] SCANNER FOR A CENTRALLY CONTROLLED TELEPHONE SWITCHING SYSTEM

[75] Inventors: Stanislas Kobus, Palaiseau; Albert Kruithof, Meudon; Lucien Nicolas Leon Viellevoye, Ris-Orangis, all of France

[73] Assignee: International Standard Electric Corporation, New York, N.Y.

[22] Filed: May 16, 1972

[21] Appl. No.: 253,717

[52] U.S. Cl. .......................... 179/18 FG, 179/18 ES
[51] Int. Cl. .......................... H04q 3/54
[58] Field of Search .......................... 179/18 FG, 18 FF, 179/18 ES

[56] References Cited
UNITED STATES PATENTS
3,558,828 1/1971 Marty et al. .................... 179/18 FG

*Primary Examiner*—Thomas W. Brown
*Attorney*—C. Cornell Remsen, Jr. et al.

[57] ABSTRACT

A scanner is disclosed for a telephone switching system which is controlled by a central processor employing a stored program. The different units to be scanned are arranged in groups. The scanner receives from the processor the address of a first group to be interrogated and the number of groups to interrogate. It interrogates the first group and presents the interrogating result to the processor. The processor then gives authorization for stepping to the interrogation of the next group. The scanning progression is carried out by decrementation of the group address. The number of groups is also decremented in the same way until it takes a value of zero, indicating the end of scanning.

4 Claims, 5 Drawing Figures

SCANNER FOR A CENTRALLY CONTROLLED TELEPHONE SWITCHING SYSTEM

BACKGROUND OF THE INVENTION

1. Field of the Invention

The present invention concerns a switching system scanner and, more particularly, a scanner which can be used in a centrally controlled telephone exchange to enable the central unit to collect information from different exchange units.

2. Description of the Prior Art

A telephone exchange includes a certain number of units permanently or temporarily associated with the lines and circuits used for the transmission and the reception of signals relating to call establishment, holding and release. Among these units are dial-pulse receivers and senders which are temporarily associated with the lines and circuits, as well as junctors permanently associated with all types of incoming and outgoing circuits.

In an exchange employing centralized control, the central unit must be informed of the situation of each unit in a way enabling it to detect all the significant events and to control the resulting operations, according to the provided operation, or to update data it has concerning the situation in the exchange.

It is known to use for that purpose a scanner which, under the control of the central unit, interrogates cyclically the units and provides the central unit with the data thus obtained. One could imagine the scan of all the units at regular time intervals. However, it is easily noticed that the function of some units or parts of units requires a high scanning rate, while the function of other units or parts of units authorizes a lower rate while respecting the operation needs. The reception of dialling signals imposes a high rate in order to detect each element of the dialled number while the availability of the lines or trunk circuits can be searched at a lower rate. It is then desirable to class as much as possible the scanning rate of the units or parts of units according to their functions. Moreover, each unit provides data of various functional types which it is preferable to collect separately in independent scanning cycles to meet the same scanning rate requirements and to simplify further data processings. Nevertheless, each unit must have a single address for obvious reasons of simplification of the processing in the central unit.

Moreover, the collection of data originated from units constitutes a heavy load for the central unit due to the great number of units to be scanned. It is thus desirable to reduce the number of tasks assigned to the central unit in the scanning process.

SUMMARY OF THE INVENTION

The invention meets this requirement by providing a scanner characterized in that it includes a first recording device provided for receiving, from the central unit, the address of a group of units (unit group) to be interrogated, a device for indexing the contents of said first recording device, a second recording device provided for receiving the result of a unit group scanning and placing it at the central unit's disposal, a sequential circuit started under control of the central unit and delivering time-shared control signals for controlling the different operations carried out by the scanner. These various means are arranged in order that, during the unit group scanning, the central unit supplies the scanner with the address of the first group to be interrogated and starts the sequential circuit. The scanner, under control of the sequential circuit, interrogates the unit group whose address is stored in the first recording device, writes the scanning result into the second recording device, then blocks the sequential circuit operation. The central unit reads out the contents of the second recording device and starts anew the sequential circuit which then controls the operation of the indexing device which indexes the group address stored in the first recording device in order to interrogate the group designated by the new address thru obtained. The sequential circuit is then again in its initial position and controls the next group interrogation, and so on until all the groups have been interrogated. Such a system relieves the central unit from the calculation work of the address of each group to be interrogated while leaving to it the processing of the obtained information in order to have a maximum flexibility of the system.

The scanner, according to the invention, is also characterized in that a third recording device is provided for receiving an indication of the number of groups to be scanned transmitted by the central unit simultaneously as the address of the first group to be interrogated as well as a device for decoding said third recording device contents. The indication of the number of groups to be scanned is indexed in the same way and simultaneously as the group address until it reaches a determined value for which the decoding device delivers an end-of-scanning signal which is then transmitted to the central unit to indicate to it that the scanning is over.

BRIEF DESCRIPTION OF THE DRAWINGS

Various other features will be apparent from the following description which is given by way of non-limited example referring to FIGS. 1 to 4 which represent.

DESCRIPTION OF PREFERRED EMBODIMENTS

Figure 1:
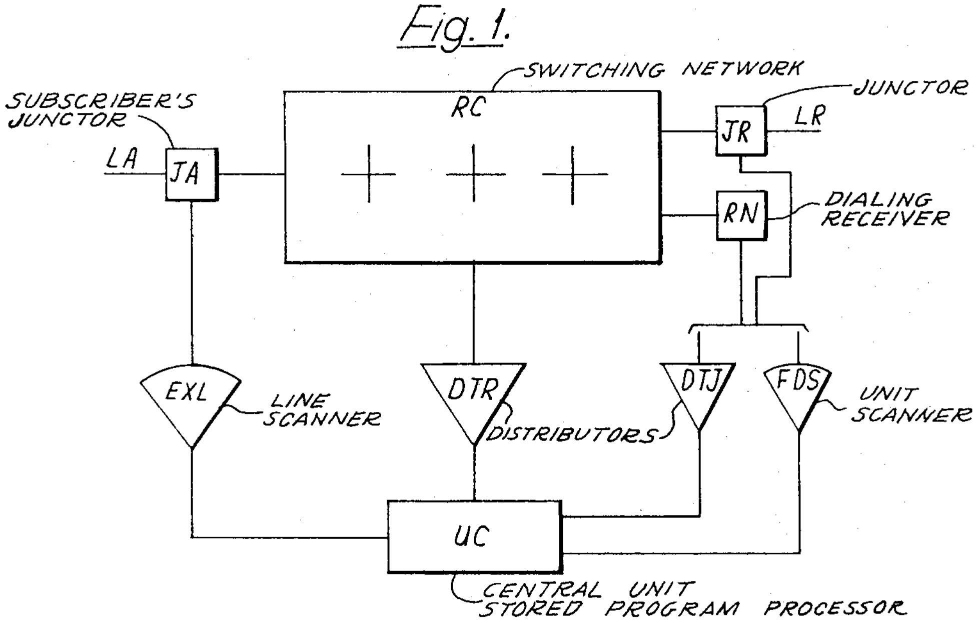
FIG. 1, the block diagram of a centralized control telephone exchange in which may be used the system, according to the invention.

FIG. 1 represents the simplified block diagram of a centralized control telephone exchange. The subscribers' lines LA are each terminated by an individual subscriber's line equipment or subscriber's junctor JA. Through its subscriber's junctor JA, each line is connected to an outlet of a switching network RC. As an example, there has been represented a switching network constituted by three crossbar switch stages. Common units of various types are connected to the inlets of the network RC, as required, among which have been represented junctor JR and dialling receivers RN. A junctor JR has two accesses, one of which is connected to an inlet of the switching network RC and the other, for example, to a circuit LR leading to another exchange. It is provided for the establishment of an outgoing call; a calling line is then connected to one access, through the switching network RC and, therefore, is connected to circuit LR. Junctor JR supplies on the line and circuit the necessary currents and signals. It supervises the call and detects, in particular, the end of it.

The operation of this exchange is rulled by a central unit UC which is nothing but a recorded program electronic processor. This central unit UC receives information from the subscribers' junctors JA, through a line scanner EXL and from the common units such as junctors JR and receivers RN, through a unit scanner FDS. The central unit UC processes the information thus obtained, in a way defined by the recorded program, and deduces the actions to be taken with the view of call establishment, that is, mainly, the connections to be established in the switching network RC and the signals that must send the common units on the lines and circuits. The corresponding orders are transmitted to the switching network RC through a distributor DTR and to the common units through a distributor DTJ.

A common unit includes a certain number of circuits each supplying a binary datum in a way convenient to the seizure of said datum by the scanner FDS and called for this reason scanning point. When interrogated by scanner FDS, these scanning points deliver in response data characterizing the state of the common unit. These points may be designed in different ways, either by means of contacts, capacitors as described in the Spanish patent application No. 384,058, filed On Sept. 29, 1970 in the name of STANDARD ELECTRICA S.A., and entitled "Circuito de prueba del estado de una linea de dos hilos," or by means of transformers, etc.

In such an exchange, the common unit scanning is very important. Indeed, the common units are numerous and require to be scanned at a relatively high frequency; the scanner FDS thus has great dimensions and a very high-speed operation. It scans, for example, a few hundred scanning points in a few hundred microseconds.

Moreover, the common unit scanning points need not be all scanned at the same rate. For example, in junctors JR, the points displaying circuit LR availability or indicating the end of the call do not supply pressing data. On the contrary, the points displaying the different signals received in a receiver RN must be scanned at a high-speed rate for reconstruction of the dialling. It is thus provided to scan each point of a unit at a just sufficient rate, according to the item of information given by this point.

Figure 2:
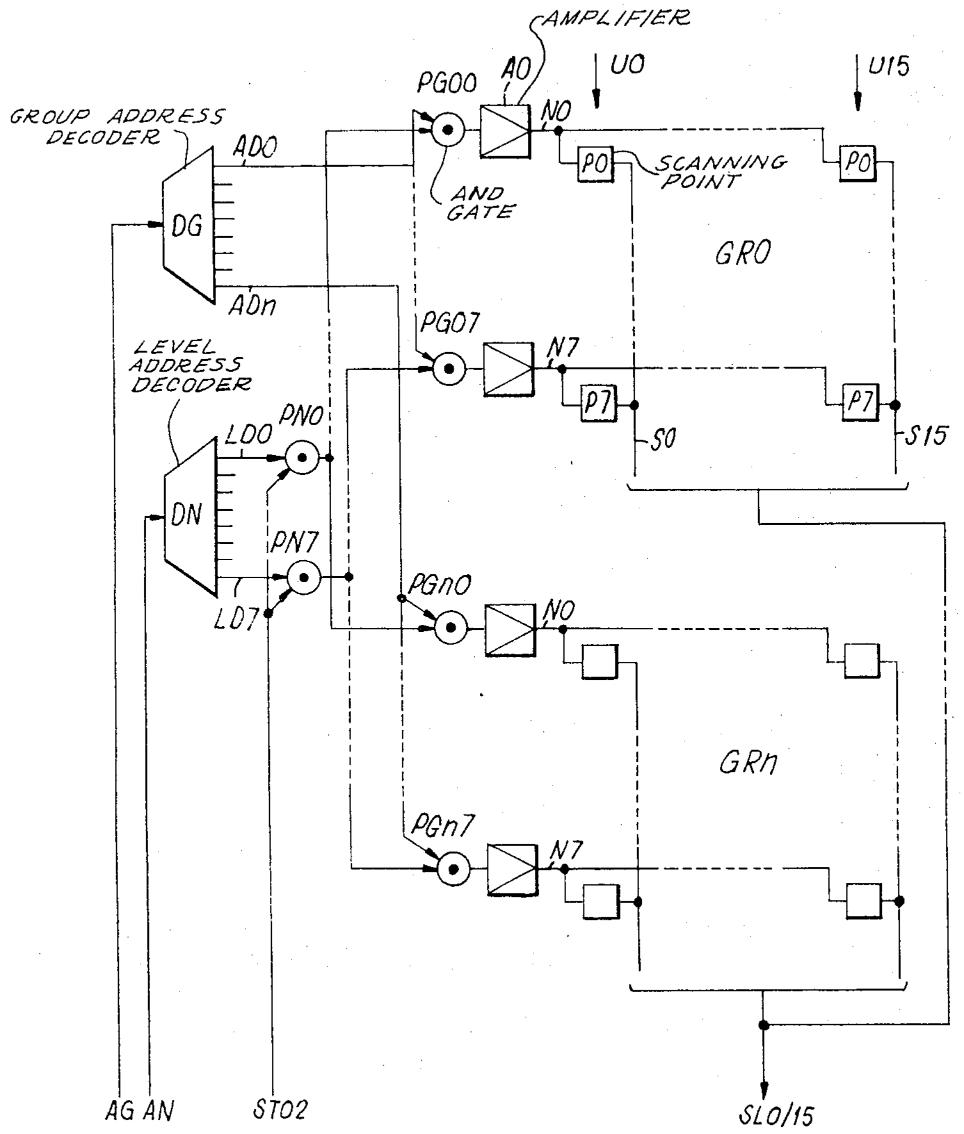
FIG. 2, the diagram of an exemplary scanning matrix with its addressing circuits designed according to the invention.

Referring to FIG. 2, a system for the distribution of the scanning points according to their function will be described, which enables the scanning of groups of points having the same function.

The units to be scanned are distributed in several unit groups of the same type. The points of the different units of a group are arranged in the form of a partial matrix such as GR. or GRn. In a matrix, the points of a same unit are arranged according to a column in such an order that homologous points of the group units are in a same row called level. In this way, the partial matrix GR. contains the points of 16 units U0 to U15. Each unit has 8 scanning points P0 to P7. The homologous points, such as P0 and P7, of units U0 to U15 are respectively arranged on levels N0 and N7. Besides, the same rank levels in the different partial matrices correspond to scanning points of the same functional type, it is the case, for example, for levels N0 of matrices GR. and GRn.

A group address decoder DG supplies, from an address received on the link AG, a signal on one of conductors AD0 to ADn and thus designates the partial matrix of a group to be interrogated. This signal prepares the operation of AND gates such as PG00 to PG07 or PGn0 to PGn7.

A level address decoder DN supplies, from level address received on the link AN, a signal on one of conductors LD0 to LD7 and thus designates a level to be interrogated. This signal prepares the operation of one of the gates PN0 to PN7.

Under control of a signal ST02, applied to gates PN0 to PN7, a level is interrogated in a partial matrix.

For example, if decoder DG marks wire AD0, the transmittal signal prepares the operation of gates PG00 to PG07. The marking of wire LD0 by decoder DN prepares the operation of gate PN0. Under control of signal ST02, gate PN0 is enabled and delivers a signal which enables gate PG00. The latter delivers a signal which, amplified by an amplifier A0 associated with level N0, is transmitted to all points P0 of the partial matrix GR0. Each point, according to its state, transmits a signal on the column wire (S0 a S15) which it is connected to, towards the link SL0/15. All the signals transmitted constitute an item of information characterizing the state of points P0 of units U0 to U15 of group GR0.

The marking of wires LD0 and AD0 has thus permitted to interrogate points P0 of units U0 to U15 of group GR0. In other respects, it can be seen that the scanning, in the different groups, of level N0, for example, assigned to points of a same functional type, will be simply done by keeping the level address at the input of decoder DN, wire LD0 thus remaining marked, and by varying the group address at the input of decoder DG in order to mark successively wires AD0 to ADn towards the corresponding partial matrices GR0 to GRn. The interrogation of level N0 in each addressed group will result, each time, in the transmission on the link SL0/15 of data characterizing the states of the points of level N0 of the interrogated group. It will be thus easy for the central unit to scan all same type points of the installation.

Figure 3:
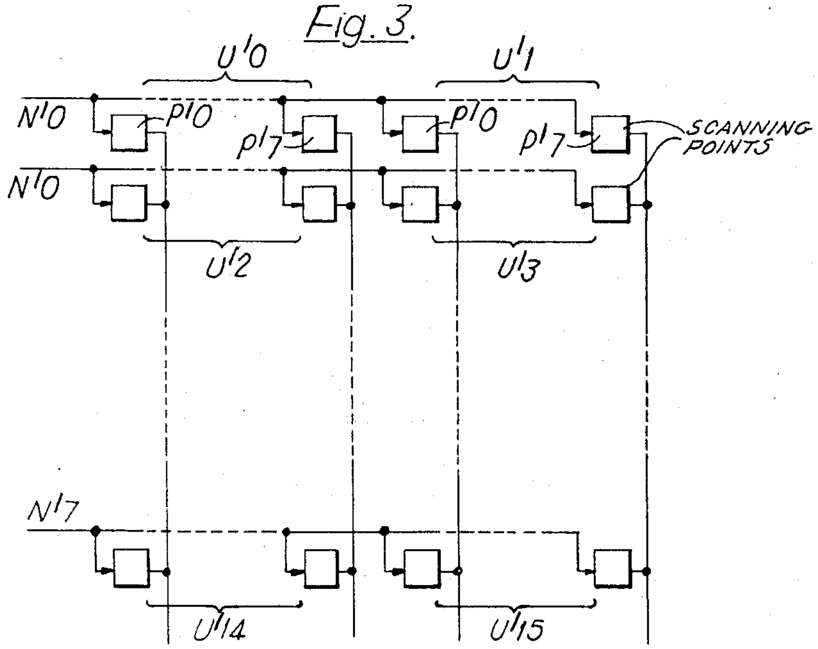
FIG. 3, another embodiment of the scanning matrix of FIG. 2.

In some cases, it can be however necessary to scan simultaneously several points or the totality of the points of a unit. The previous arrangements also enable all these points to be grouped at one level. For instance, as shown on FIG. 3, the eight points P'0 to P'7 of a unit U'0 and the eight points P'0 to P'7 of a unit U'1 are grouped at the level N'0. The points of the units U'2 and U'3 are grouped at the level N'1, the points of the units U'14 and U'15 at the level N'7. The thus constituted scanning matrix is arranged in the same way as that of FIG. 2, which will enable the same addressing circuits as above to be used. The scanning of a level, N'0, for instance, in a group of this type will then enable all the points of the units (P'0 to P'7 of U'0 and U'1) placed at this level to be read.

The arrangement which has just been described, according to which a matrix with several levels is assigned to a group of units, presents many advantages in consideration, more particularly, of the scanner wiring and the addressing.

Indeed, if it is considered that a group of units is mounted in a structural unit (subrack), the gates of the respective levels such as PG00, the amplifiers of the respective levels such as A0 can be also mounted in this unit and the wiring will include only eight level address conductors originating from the device DN and gates PN0 to PN7, only one group address conductor originating from the device DG and the 16 reading conductors.

Moreover, in case of the exchange extension, which will result in the addition of other groups of units, it will suffice to add new matrices, multipled to the outputs of gates PN0 to PN7 and to the link SL0/15; they will be selected by additional outputs of the device DG. From the addressing point of view, it will only require an increase of the groups to be scanned, without any rearrangement of the unit assignment with respect to the scanner.

In other respects, with a view to relieving the central unit, it has appeared desirable to give the scanner the function of controlling this scanning progression from a group to the next one as well as the relevent annex functions. Now will be thus described, referring to FIGS. 4 and 5, the control circuits meeting this requirement and controlling scanning circuits such as those of FIG. 2.

Figure 4:
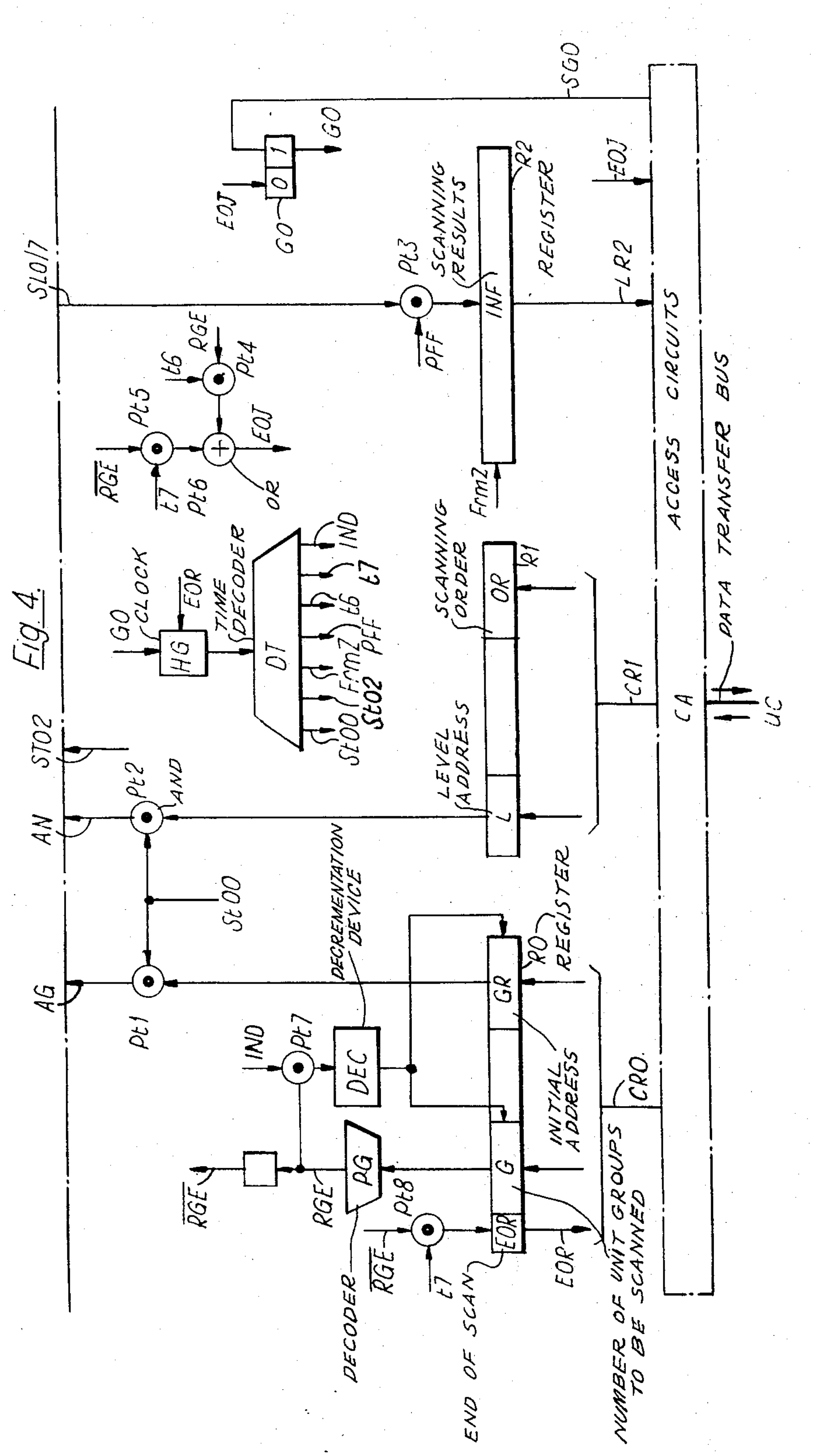
FIG. 4, the diagram of the control circuits of a scanner, according to the invention.

FIG. 4 represents the control circuits of scanner FDS of FIG. 1. These control circuits are associated with the scanning matrix of FIG. 2. They receive from the central unit UC scanning orders, supply appropriate control signals to the interrogating circuits, collects the status signals constituting the scanning results, record these results and place them at the central unit's disposal.

The control circuits of FIG. 4 mainly include a register R0 receiving the initial address of a common unit group to be scanned GR, the number of unit groups to be scanned G and an end-of-scanning sequence indication EOR, a register R1 receiving from the central unit a scanning order OR and a level address L, a register R2 in which are written the scanning results that the central unit will read out, a decrementation device DEC enabling the decrementation by one unit of the data GR and G stored in register R0, a decoding device PG, a clock HG combined with a time decoding circuit DT, as well as various data processing circuits which will be defined in the course of the scanner operation.

These control circuits communicate with the central unit UC through access circuits CA. A data transfer bus connects the access circuits CA to the central unit UC. The access circuits CA are designed in a well-known way which depends upon the nature of the transfer bus. Their description is beyond the scope of the invention. It will be only noted that they enable the central unit UC to read out the contents of register R2, displayed on conductors LR2, as well as the item of information EOR stored in register R0, displayed on the link EOR. They also enable the central unit UC to write any required data into register R0, through the link CR0, and into register R1, through the link CR1. Finally, they enable the central unit to call scanner FDS by setting bistable G0 in position 1 and transmit an end-of-job signal EOJ towards the central unit.

It will be initially assumed that all circuits are at rest, the scanner being unoperated. Registers R0 and R1, in particular contain no information. Bistable G0 is in position 0. Moreover, a condition $\overline{EOJ}$ is supplied.

The central unit UC writes an initial address of a common unit group to be scanned GR and an indication of the number of units groups to be scanned G into register R0 through access circuits CA and link CR0. It also writes a scanning order OR and a level address L into register R1 through circuits CA and link CR1.

The scanner thus receives an address defining a group of sixteen common units which will be first interrogated and the address of a level in this group. It will then automatically interrogate a certain number of similar groups as it will be further seen. The order OR indicates to the scanner that it must perform a scanning function. Indeed the scanner may have the ability of performing different types of functions and the central unit must indicate to it which type it must perform. As the scanning function is the only one contemplated in the scope of the present invention, the order OR will not therefore be used in the following description.

The address GR and the indication G each of which consist of 5 bits, which makes it possible to scan up to 32 unit groups. The level address L consists of 3 bits in order to scan 8 different levels. The value of the indication G equals *n*-1 where *n* represents the number of groups to be scanned, in order that when there remains only one group to be scanned the indication G have the value 0. The decoding device PG delivers a signal RGE when the modification G is different from 0, that is when there are more than one unit group to be interrogated and delivers no signal when G = 0 (case when there is only one group to be interrogated). As an example, it will be assumed that five groups must be interrogated. The indication G thus has the value 4 and device PG delivers signal RGE.

The central unit UC then starts the scanner by setting bistable G0 in position 1 through link SG0. The signal G0 starts clock HG. This clock includes a time base driving a four-stage counter delivering signals HG0 to HG3 illustrated by the first four waveshapes of FIG. 5. It can be seen, that the four counter stages being initially in position 0, the stage HG0 delivers a square wave whose positive pulses are referenced T0 to T7. Each other stage HG1 to HG3 changes position when the positive pulse delivered by the preceding stage ends. The counter thus defines eight time positions S0 to S7 indicated in FIG. 5 waveshapes.

Signals HG0 to HG3 delivered by the clock are transmitted to a time decoding device DT which supplies St00, St02, FrmZ, PFF, *t*6, *t*7 and IND also illustrated by FIG. 4 waveshapes.

The decoding device DT, at the beginning of pulse T0, delivers signal St00. This signal enables gates Pt1 and Pt2 which transmit, towards the scanning circuits, of FIG. 2, the address GR of the first group to be interrogated as well as the address L of the level to be interrogated in this group. Gate *pt*1 transmits the address of the group to be interrogated on link AG towards decoder DG of FIG. 2. This address consists of 5 bits, which makes it possible to address one group among 32. Decoder DG delivers a signal on one of its output wires, for example wire AD0. This signal prepares the operation of gates PG00 to PG07. Gate *pt*2 transmits the address of one level on link AN towards decoder DN of FIG. 2. This address consists of 3 bits, which makes it possible to address one level among 8. Decoder DN delivers a signal on one of its output wires, for example wire LD0. This signal prepares the operation of gate PN0.

Figure 5:
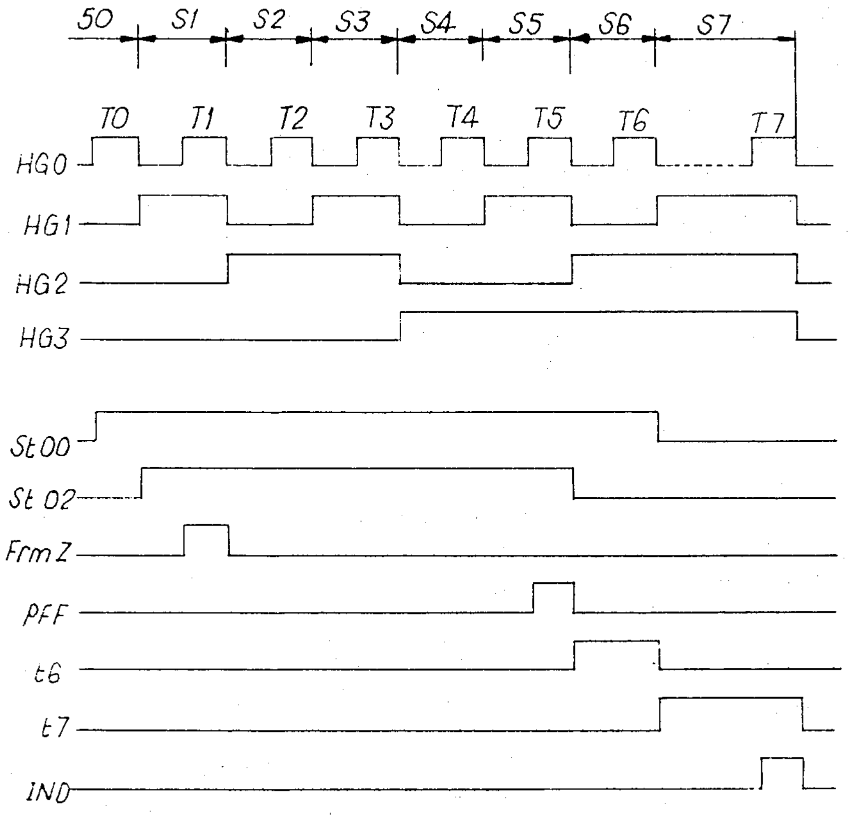
FIG. 5, waveshapes illustrating the different time base signals used in the scanner of FIGS. 2 and 4.

As indicated in FIG. 5, signal St00 is supplied since the generation of signal T0 while the counter is in position S0, till the end of pulse T6. This duration is that assigned to the interrogation of the units belonging to a group designated by the address GR.

A little while after the beginning of signal St00, the time decoding device DT delivers a signal St02 (at the end of pulse T0). This signal is transmitted through link St02 to the scanning circuits of FIG. 2 in order to control the operation of one of the gates PN0 to PN7 marked by decoder DN. According to the chosen example, gate PN0 operates. It delivers a signal towards the gates such as PG00 and PGn0 each assigned to the level N0 of the different groups. Only gate PG00, belonging to group GR0 whose gates PG00 to PG07 are marked by decoder DG, operates and supplies a signal for interrogating points P0 of level N0 of matrix GR0 as above-described.

Signal St02 lasts up to the end of pulse T5. It delimits the time necessary to the scanning circuits for responding to the scanning signal supplied to them and for recording the response in register R2.

The time decoding device DT delivers a signal FrmZ corresponding to pulse T1 duration. This signal is applied to register R2 for resetting each stage of this register and preparing the recording of the scanning result.

Then, always by referring to FIG. 5 waveshapes, it can be seen that the time decoding device DT delivers a signal PFF corresponding to pulse T5 duration. This signal enables gates Pt3 (AND gate) through which the scanning result is written into register R2. The data INF thus recorded is at the disposal of the central control unit UC, through link LR2.

During pulse T6, signal T6 is supplied. Gate Pt4 (AND gate) operates under the control of signals RGE and T6. Gate Pt6 (OR gate) also operates and delivers signal EOT. This signal is sent towards the central unit to inform it that the result of the scanning of level N0 of the first unit group is available in register R2 : signal EOT also controls the resetting of bistable G0. Signal G0 is no longer sent to clock HG which stops before delivering pulse T7.

When the central unit UC has read out the contents INF of register R2 it delivers anew a signal on conductor SG0. Bistable G0 is set in position 1 in order to authorize the operation of clock HG and the scanning progression.

Clock HG delivers pulse T7 which entails, in decoder DT, the delivering of signal IND. This signal is applied to gate Pt7 which also receives signal RGE. Gate Pt7 delivers a signal towards the decrementation device DEC which decrements by one unit the address GR and the indication G contained in register R0. The address of a new group to be interrogated is thus obtained and the indication G has the value 3. During the next pulse T0, signal St00 is supplied again and the above-described operaion is renewed for the interrogation of level N0 of the new group. During the interrogation of this new group, the result of the preceding group scanning is processed by the central unit which will again read out the contents of register R2. It suffices that the duration of a group interrogation is smaller than that of the interrogation result processing in order that the scanner may not slow down the central unit work.

The next groups are interrogated in the same way until the indication G takes the value 0 and that the decoding device PG ceases to deliver signal RGE, which indicates that the new address RG contained in register R0 designates the last group to be interrogated. The indication G has than the value 0. The device PG no longer delivers signal RGE. The inverter I delivers signal $\overline{RGE}$. This last group is interrogated in the same way except at the end of the operation when signal EOJ, instead of being supplied during pulse T6 under control of signal RGE (gate P*t*4), is delivered after the end of pulse T6 (signal *t*7), under control of signal $\overline{RGE}$. Simultaneously, signals *t*7 and $\overline{RGE}$ control the operation of gate Pt8 and an indication EOR is written into register R0.

Signal EOJ is transmitted towards the central unit and resets bistable G0 which stops clock H6.

Signal EOR is also sent to the central unit and forces to 0 clock HG.

When the central unit further consults the scanner situation, it is informed by signal EOJ that a scanning result is available in register R2 and that it must read it out. By signal EOR, it is informed that all the groups to be interrogated have duly been interrogated and that the scanner has thus performed its function.

It is obvious that the preceding description has only been given as an unrestrictive example and that numerous alternatives may be considered without departing from the scope of the invention. In particular, the numerical examples have only been given to facilitate the description.

We claim:

1. A switching system scanner of use in a switching system incorporating a plurality of units for supplying data to a central unit and a plurality of different circuits to be scanned, said circuits being distributed in groups of units, said scanner comprising a first recording device for receiving from the central unit the address of a first group of units to be interrogated, an adding unit for indexing the contents of the first recording device, a second recording device provided for receiving data indicating the results of interrogating a group of units, said second recording device placing the interrogation results at the central unit's disposal, a sequential circuit operated under control of the central unit and delivering time control signals for controlling the different operations carried out by the scanner; during the scanning of unit groups, the central unit supplying the scanner with the address of the first group to be interrogated and starting the sequential circuit; the scanner including means under control of the sequential circuit for interrogating the unit group whose address is supplied writing the scanning result into the second recording device, and then blocking the sequential circuit operation; the central unit reading out the contents of the second recording device; the central unit then starting anew the sequential circuit which then controls the operation of the indexing device which indexes the group address stored in the first recording device in order to interrogate the groups designated by the new address thus obtained, the sequential circuit being then again in its initial position and controlling the next group interrogation, and so on until all the groups have been interrogated, said system thus relieving the central unit from the work of the calculation of the address of each group to be interrogated while leaving to it the processing of the obtained data in order to provide maximum flexibility to the system.

2. A scanner as defined in 1, in which different units to be scanned are distributed in groups of units and inside a group of units, the scanning points of the different units are also distributed in groups of points of the same type (called levels) so that the scanning rates of the different types of points may be freely chosen by the central unit.

3. A scanner as defined in 2, in which points of the same types in the units of different groups are situated at homologous levels in these groups, which enables points of a determined type to be scanned by designating a level and by scanning, group after group, this level in several groups.

4. A scanner as defined in 1, in which a third recording device is provided for receiving an indication of the address of the first group to be interrogated as well as an indication of the level to be interrogated in this group, said third recording device delivering an end-of-scanning signal when the indication of the number of the group to be scanned reaches a determined value, these various means being arranged in such a way that the number of groups is indexed in the same way and simultaneously as the group address, until it reaches the determined value for which the decoding device delivers the end-of-scanning signal which is then transmitted to the central unit to indicate to it that the scanning is over.

* * * * *